United States Patent [19]

Slade et al.

[11] Patent Number: 5,786,854
[45] Date of Patent: Jul. 28, 1998

[54] PORTABLE SELF-CONTAINED TELESCOPING CAMERA TOWER SYSTEM FOR HIGH ANGEL IMAGING

[75] Inventors: Mark W. Slade; Veronia V. Slade. both of Weston, Conn.; Steven M. Nettik. Bozeman; Torence P. Brogan. Belgrade, both of Mont.

[73] Assignee: Tree Top Systems, Inc., Westport, Conn.

[21] Appl. No.: 561,371

[22] Filed: Nov. 21, 1995

[51] Int. Cl.$^6$ .......................... H04N 5/225; G03B 17/00
[52] U.S. Cl. .................. 348/373; 348/375; 352/243; 396/419
[58] Field of Search ................... 348/373, 375, 348/376; 396/419, 427, 428; 352/243; 343/878, 880, 883; 52/118; H04N 5/225

[56] References Cited

U.S. PATENT DOCUMENTS

| | | |
|---|---|---|
| 1,358,402 | 11/1920 | Thalhammer. |
| 2,795,303 | 6/1957 | Muehlhause et al. ............ 189/14 |
| 3,328,921 | 7/1967 | Keslin ............................ 52/121 |
| 4,151,534 | 4/1979 | Bond ............................. 343/883 |
| 4,357,785 | 11/1982 | Eklund ........................... 52/632 |
| 4,710,819 | 12/1987 | Brown ............................ 358/229 |
| 4,815,757 | 3/1989 | Hamilton ........................ 280/764 |
| 4,932,176 | 6/1990 | Roberts .......................... 52/118 |
| 5,003,328 | 3/1991 | Gaynor ........................... 354/81 |
| 5,101,215 | 3/1992 | Creaser, Jr. ................... 343/883 |
| 5,218,375 | 6/1993 | Hillman ......................... 343/883 |
| 5,435,515 | 7/1995 | Di Giulio et al. ............... 248/576 |
| 5,516,070 | 5/1996 | Chapman ......................... 248/404 |

*Primary Examiner*—Andrew Faile
*Assistant Examiner*—Ngoc-Yen Vu
*Attorney, Agent, or Firm*—St. Onge Steward Johnston & Reens LLC

[57] ABSTRACT

A portable, self-contained telescoping camera tower system permits high angle imaging and rapid and smooth change of perspective. The camera tower is a stand-alone unit capable of being transported, set up and operated by a single individual and which provides steady advance and retreat of the tower over its full range of up and down movement. An arrangement of pulleys, bearing surfaces, and drive means, preferably with two power-up drives and a separate power-down drive, assures smooth operation though its full operating range

10 Claims, 6 Drawing Sheets

PORTABLE SELF-CONTAINED TELESCOPING CAMERA TOWER SYSTEM FOR HIGH ANGEL IMAGING

TECHNICAL FIELD

The invention relates to improvements in portable, self-contained telescoping camera tower systems for high angle imaging. In particular, the invention provides a smooth-operating camera tower of this type which is a standalone unit capable of being transported, set up and operated by a single person. It is a particular advantage of the invention that the system provides steady advance and retreat of the tower over its full range of up and down movement.

The ability to record people, events and scenes on film has captured the imagination of people across countless cultures since the advent of the camera. Artists and hobbyists regale the realization on film of their plans or aspirations. Still and moving pictures are art forms which test intellect and skill, as the artist pursues near ideal perspective, lighting and technical execution. The freedom to choose and quickly modify the perspective is as essential as the other physical restraints on the photographer. It has long been the desire of photographers to be able to take pictures from heights that cannot be easily reached. It has also been their desire to have equipment which is fully portable and easily set up by a single person. Importantly, it is essential to have a support that is stable and that can be moved to change the height or angle of the shot without losing stability. To date, the art has not provided a camera support that can be easily transported, set up and operated by a single person to smoothly raise and lower a camera.

BACKGROUND ART

The art has provided a number of different systems for elevating a camera to obtain high-angle pictures, or pictures which could not otherwise be easily obtained by a single camera operator standing on the ground. The beauty and apparent artistry of some photographic scenes belie the complexities of their production. The art of making a scene come to life by changing perspectives may appear simple, or go unnoticed, but that capability is often what changes good to outstanding. The equipment necessary to achieve the best of results is never shown, but it is likely to include complex hydraulics or other mechanisms not operable by, or available to a single camera operator.

Tripods have been known for many years to be suitable for positioning a camera above the action or object to obtain still and moving pictures. For example, U.S. Pat. No. 1,358,402, Thalhammer describes a massive tripod on which the camera operator sits. This type of system is largely impractical where it is necessary for the single person to transport and set up the camera. Also, the height cannot be simply modified. Other tripods of more conventional size, e.g., in U.S. Pat. No. 5,003,328 to Gaynor, have been made with telescoping legs to facilitate height adjustment, but these cannot permit changes in elevation while the camera is operating.

In U.S. Pat. No. 4,710,819, Brown discloses a suspension system which can convey a camera to various points. A system of four perimeter supports and four drives for cables leading from each permits a camera to be moved vertically and horizontally over the area covered by the perimeter supports. The system cannot, however be operated simply by a single person and would appear to have a degree of sway and bobbing accompanying all movements of the camera.

Camera mobility has also taken another route—attaching an extensible mast to a motor vehicle. For example, in U.S. Pat. No. 4,815,757, Hamilton shows a vehicle equipped with special leveling controls and a camera mast which can be pneumatically raised and lowered. Experience with pneumatic masts has shown, however, that movement can be less smooth than required for many continuous shooting situations. Minor variations in frictional drag between sliding parts can cause significant variations in mast extension movement where air or other compressible gas is the driving fluid. Variations in downward movement can be even more irregular, especially where small leaks are involved.

In U.S. Pat. No. 4,932,176, Roberts and Hitchcock describe another form of mobile extensible mast, employing a rope and pulley arrangement wherein a pair of capstans is used to drive the mast up and down. Both this mobile mast and that of Hamilton, are large and cumbersome and cannot be used without the mobile unit.

Further illustrative of extensible mast structures which use systems of ropes and pulleys are U.S. Pat. No. 2,795,303 to Muehihause and Sumbera, U.S. Pat. No. 4,357,785 to Eklund, and U.S. Pat. No. 5,101,215. Not one of these devices has a construction which would make it practical for a single operator to carry it to a location, set it up there and operate it smoothly in both up and down movements to obtain high-quality photographs from unusual and varied perspectives.

In U.S. Pat. No. 5,218,375, Hillman describes an antenna mast that could be operated by a single soldier; however, the mechanism chosen for portability would make it unsatisfactory for the purposes of the present invention.

There remains a need for a portable, self-contained telescoping camera tower system enabling for high angle by a smooth-operating camera tower which is a stand-alone unit capable of being transported, set up and operated by a single individual. There is a special need for such a tower which can provide steady advance and retreat of the tower over its full range of up and down movement.

DISCLOSURE OF THE INVENTION

It is an object of the invention to provide an improved portable, selfcontained telescoping camera tower system for high angle imaging.

It is another object of the invention to provide a smooth-operating camera tower of this type which is a stand-alone unit capable of being transported, set up and operated by a single individual.

It is another and still more specific object of the invention to provide a smooth-operating camera tower of this type which is a stand-alone unit capable of being transported, set up and operated by a single individual and which provides steady advance and retreat of the tower over its full range of up and down movement.

These and other objects are achieved by the present invention which provides an improved portable, self-contained telescoping camera tower system for high angle imaging, comprising: (a) a multi-segment, vertical mast including (i) a base tubular segment having an interior surface on which bearing means are supported, and having a pulley mounted at the uppermost end having an axis of rotation perpendicular to a first wall of the interior surface of the base tubular segment, (ii) at least one intermediate tubular segment having a smaller cross sectional dimension than the base tubular segment, an interior surface on which bearing means are supported, and an exterior surface in contact with the bearing means on the base tubular segment;

the intermediate tubular segment having pulleys mounted at both the uppermost end and the lowermost end, the pulley mounted at the uppermost end having an axis of rotation perpendicular to one wall of the interior surface of the intermediate tubular segment, and the pulley mounted at the lowermost end having an axis of rotation parallel to the first wall and having a line carrying groove extending at least partially through the first wall; (iii) a terminal tubular segment of smaller cross sectional dimension than an adjacent intermediate tubular segment and having an exterior surface in contact with bearing means on an intermediate tubular segment; (b) a drive mechanism including (i) a power unit located outside of the base tubular segment for driving at least one drum inside the base tubular element, (ii) at least one power-up drum engaged with the power unit to enable the power unit to be rotated by it, (iii) at least one line affixed at one end to the power-up drum and the other to the terminal tubular segment, the line being threaded though the pully at the uppermost end of the base tubular segment, to the pully at the lowermost end of an intermediate tubular segment, and to the pully at the uppermost end of the intermediate tubular segment; and (c) a control unit to control the operation of the power unit.

In its more preferred forms, the tower system contains from 2 to 5 intermediate sections telescoped together between the base tubular segment and the terminal tubular segment and extends to aheight of from 20 to 60 feet, e.g. 25–50 feet. Also preferably, the tower further includes shock absorber elements on each of the lowermost ends of the intermediate and the terminal tubular elements, and stops attached to the uppermost ends of nested elements to cushion movement to the fully extended position. The bearing means preferably comprise L-shaped blocks positioned in the corners between adjacent sides of the tubular segments, and the L-shaped blocks extend substantially the full length of mating contact between any two segments.

Also preferred for smooth operation are: a power-down drum engaged with said power unit and a line attached to the drum and the uppermost end of the terminal tubular unit whereby the drum can be rotated to withdraw the line and move the tower from an extended position to a less-extended position; and a second power-up drum and associated pulleys and line that mirror said first power-up drum with its associated pulleys and line, wherein the pulleys associated with the second power-up drum are a side opposite said first side.

BRIEF DESCRIPTION OF THE DRAWINGS

The invention will be better understood and its advantages will be better appreciated from the following detailed description, especially when read in light of the accompanying drawings, wherein.

INDUSTRIAL APPLICABILITY

The improvements of the invention have application to the field of photography and provides a portable, self-contained telescoping camera tower system for high angle imaging. The term "photography" as used herein is intended to be broad and include the use of various camera devices to obtain still and moving pictures. Essentially, any device is intended as long as it is capable of focusing on and recording in tangible form a regular array of electromagnetic radiation. The camera can be of the kind using photochemical reactions or can be electronic, whether digital or analog. The camera and the pan and tilt head can be of conventional construction, and the details of their construction and operation form no part of the present invention.

Throughout this description it will be noted that there are many parts identical to others. To simplify the description, all such identical parts will be given the same reference number.

Figure 1:
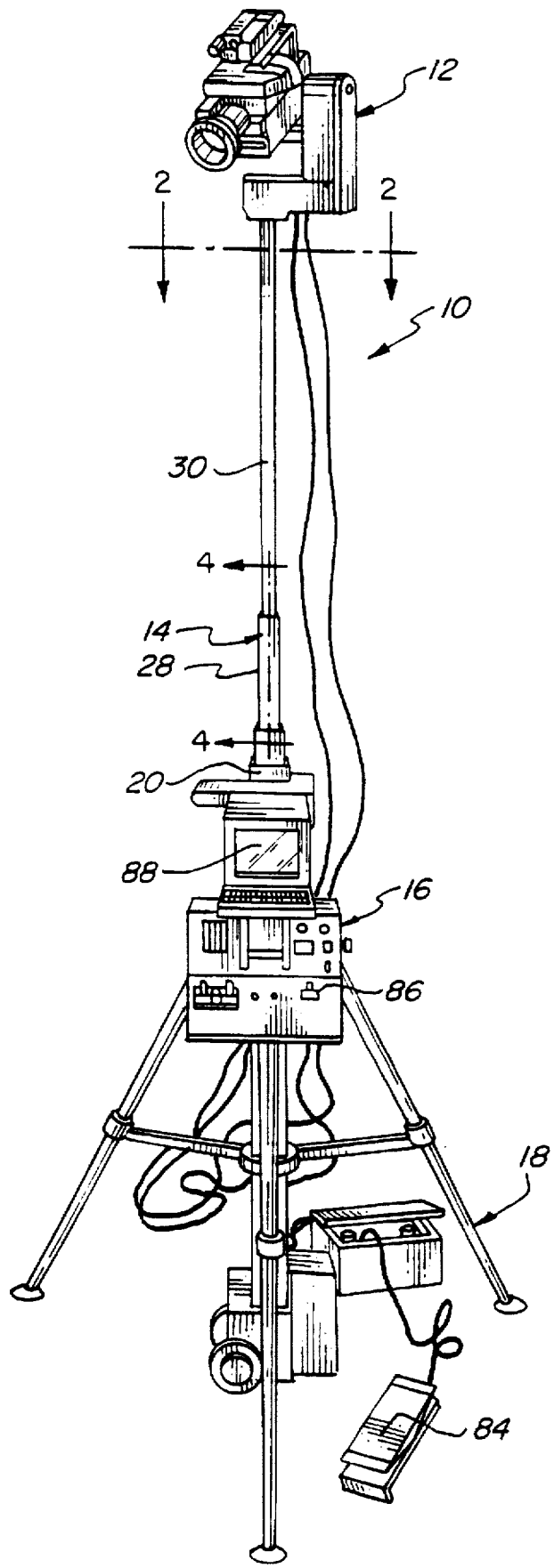
FIG. 1 is a perspective view of a portable, self-contained, telescoping camera tower system for high angle imaging of the invention.

FIG. 1 shows a perspective view of a preferred portable, self-contained, telescoping camera tower system 10 for high angle imaging of the invention shown elevating a camera mounted on a pan and tilt unit 12. The mast 14 is shown in partially extended position. A controller 16 is provided to guide movements of the mast, the camera and the pan and tilt head. The whole structure is stabilized by a suitable tripod base 18.

The mast is comprised of a plurality of tubular segments, telescoped and driven to provide smooth motion in both directions—extension and withdrawal. By the term "tubular" it is intended to include hollow elongated structures of any cross section; however, square and rectangular cross sections are preferred. They can be formed of any material of suitable weight and strength, but aluminum is preferred. Extruded square aluminum tubing is readily available and effective.

Figure 2:
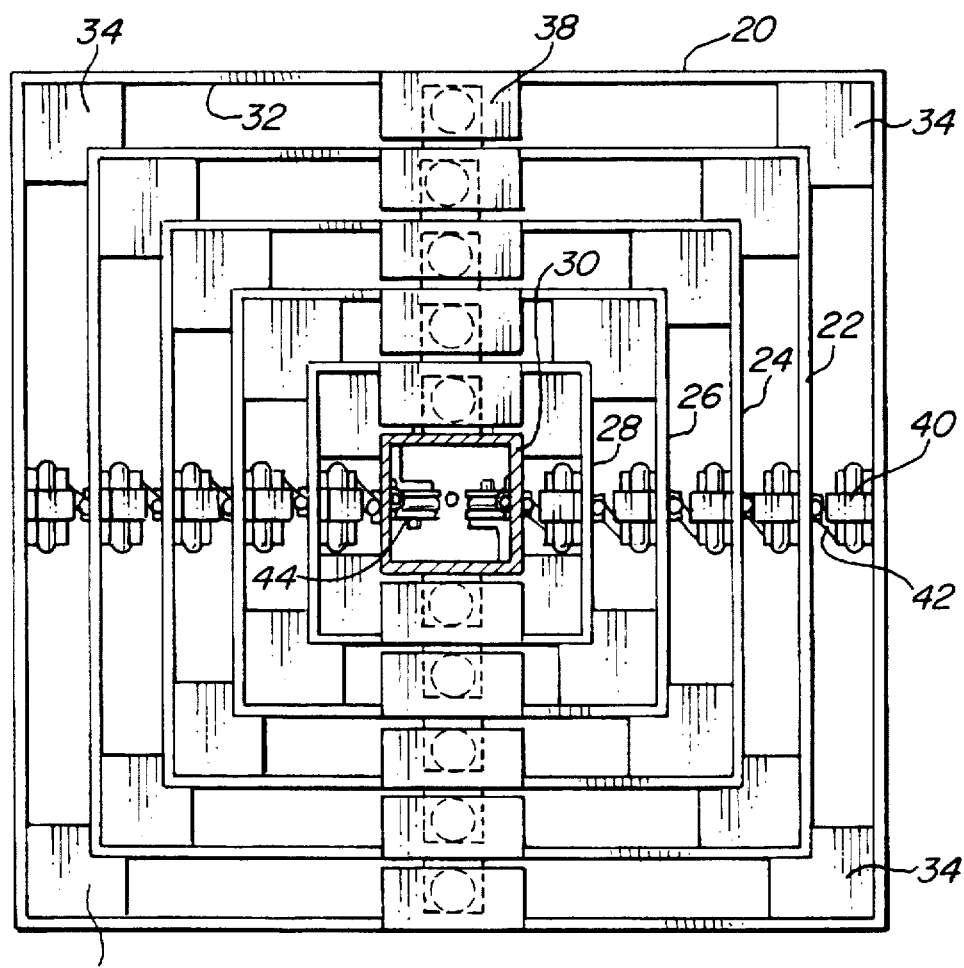
FIG. 2 is a cross sectional view taken along line 2—2 in FIG. 1.
Figure 3:
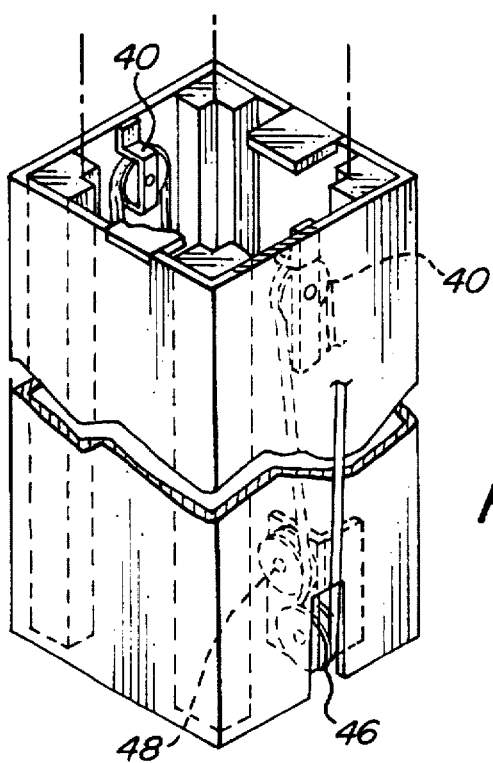
FIG. 3 is a shortened view of one of the telescoping sections of the tower system shown in FIG. 1.

FIG. 2 shows a cross section of a typical mast of the invention, and for illustration purposes includes a base tubular segment 20, four intermediate tubular segments 22, 24, 26, and 28, and a terminal tubular segment 30. The mast of FIG. 1 is illustrated with only two intermediate sections. The preferred devices can contain anywhere from two to about five intermediate tubular sections and can provide for extensions of from about 20 to about 60 feet.

Base tubular segment 20 has an interior surface 32 on which bearing means 34 are supported. The bearing means preferably comprise L-shaped blocks positioned in the corners between adjacent sides of the tubular segments. In the preferred form, the L-shaped blocks extend substantially the full length of mating contact between any two segments. These bearing means 34 can be of any suitable high-strength, low-friction material such as nylon or Delrin® acetal resin. It is an advantage of the invention that the bearing means 34 not only provide smooth operation during extension and withdrawal, but they also serve as spacers to provide the necessary room for lines, pulleys and shock absorbing elements between telescoping segments.

The base tubular segment 20 has a pulley 40 mounted at the uppermost end. The pulley 40 has an axis of rotation perpendicular to the wall to which it is attached. The pulley 40 is part of a power-up system as will be described in more detail below. It is preferred to have a second power-up system that mirrors the first wherein the pulleys associated with the second power-up drum are on a side opposite the first. It is an advantage of this aspect of the invention that balanced force can be applied to the mast to assure smooth, rapid extension.

The mast will include at least one intermediate tubular segment, as noted above. Each of these intermediate tubular sections, e.g. 22, will have a smaller cross sectional dimension than the base tubular segment 20. The interior surfaces of the intermediate sections will include bearing means 34 affixed to the corners and preferably extend the entire length of the segments. The exterior surface of segment 22 has its corners in contact with the bearing means on the base tubular segment 20. Again, this provides smooth operation.

Each of the intermediate tubular segments has pulleys mounted at both the uppermost end and the lowermost end, the pulley 40 mounted at the uppermost end, like the identical one mounted on the base tubular segment 20, has an axis of rotation perpendicular to one wall of the interior surface of the intermediate tubular segment. Pulley 46 is mounted at the lowermost end and has an axis of rotation parallel to the first wall. Each of the pulleys 46 is preferably paired with a parallel pulley 48 mounted above it. Also, each pulley 46 has a line-carrying groove extending at least partially through the first wall. This can be seen clearly in FIG. 4 where line 50 is guided through opening 52 and from there upwardly in the space between two telescoped sections to a pulley 40 on the uppermost end of inner wall of the larger, lower segment.

For the purposes of this description the term "line" is meant to include cables, ropes, chains, wires, strands, cords, and other elongated, tension-carrying members suitable for the operation of pulleys as described. These lines can be made of metal, natural fibers or synthetic fibers. High strength polymers such as Kevlar® aromatic polyamide fiber, and cables made of wire are exemplary of preferred materials.

The upper end of the mast is defined by a terminal tubular segment 30 of smaller cross sectional dimension than an adjacent intermediate tubular segment 28 and has an exterior surface in contact with bearing means 34 on that intermediate tubular segment. Like the intermediate tubular segments, the terminal tubular segment includes pulleys 46 and 48 at the lowermost end.

Figure 5:
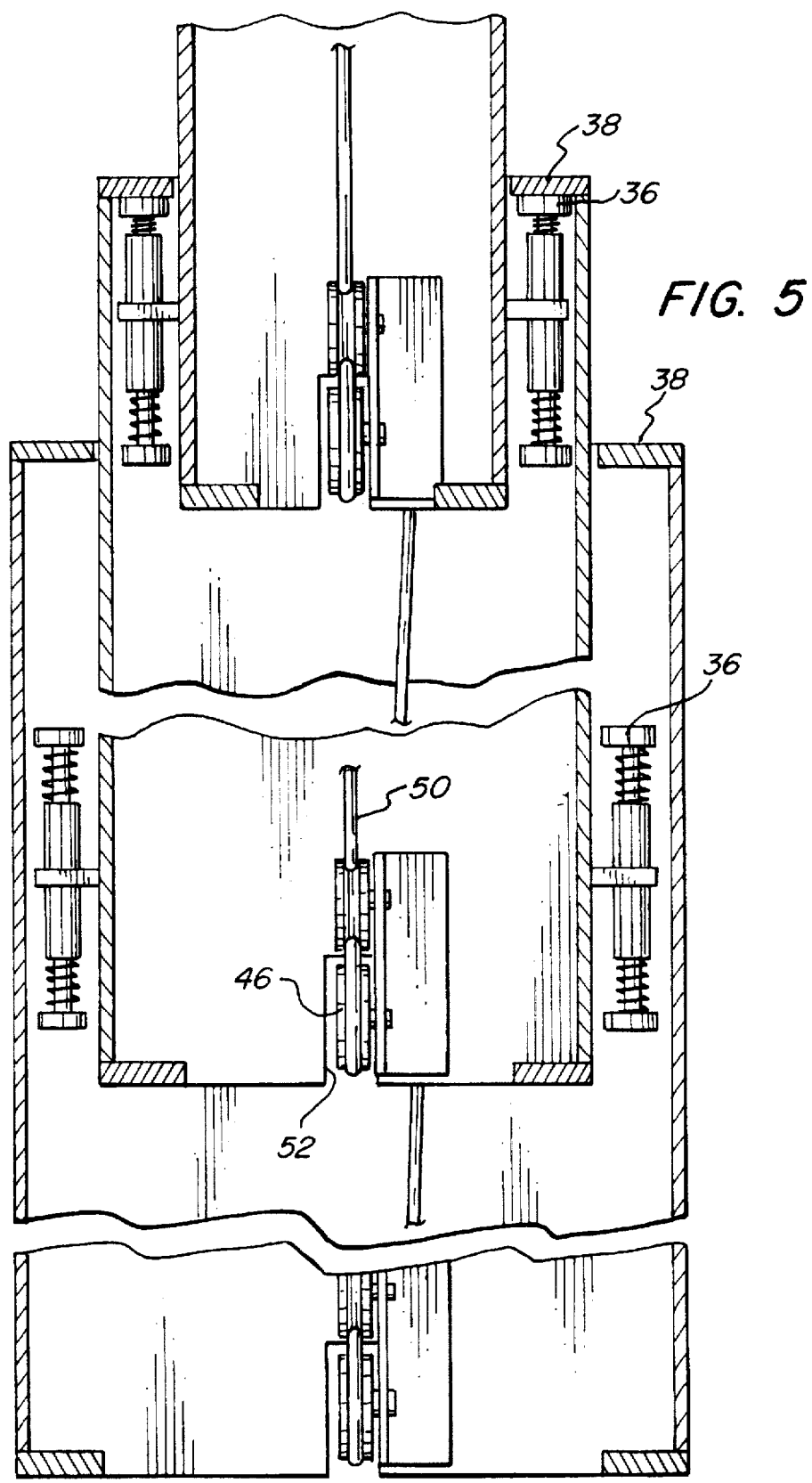
FIG. 5 is a schematic view taken along line 4—4 in FIG. 1 (but perpendicular to the view of FIG. 4) illustrating the shock absorber system used to eliminate jarring impacts at segment travel termination.
Figure 6:
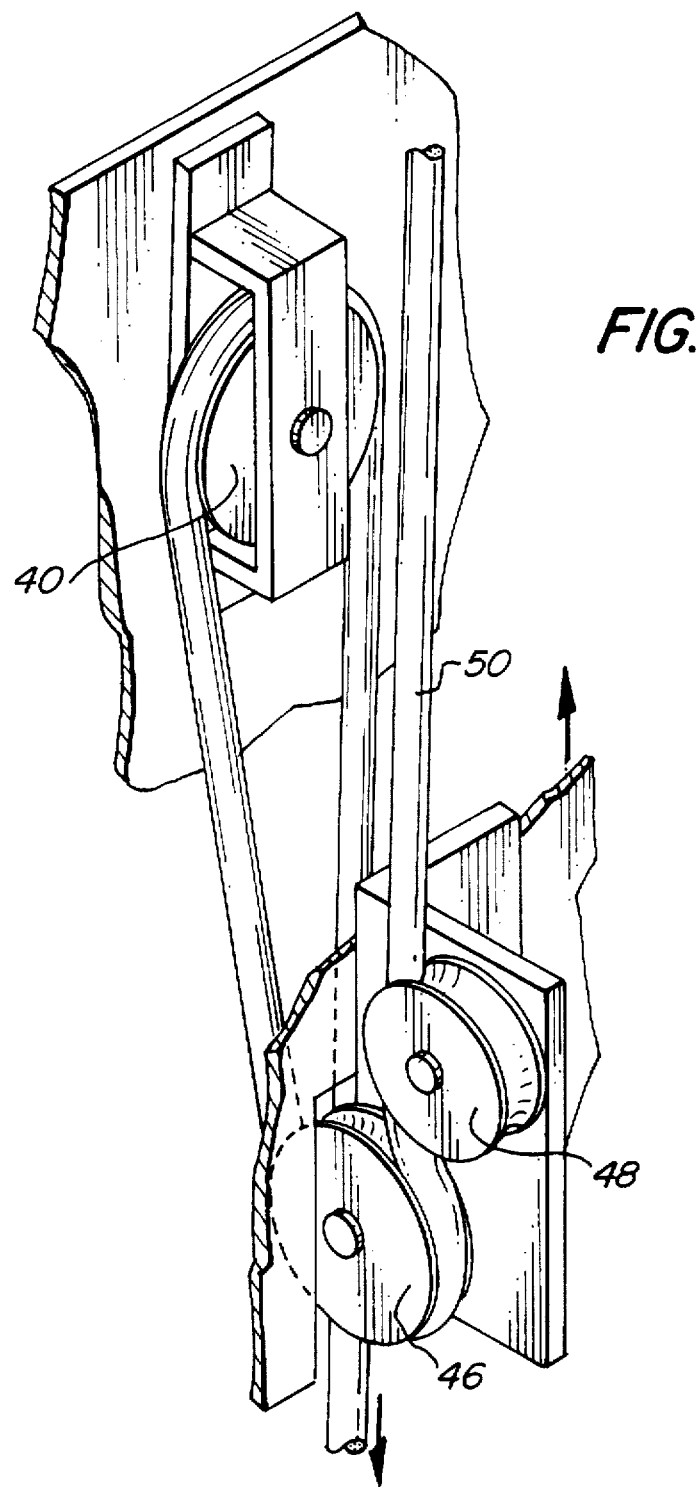
FIG. 6 is a schematic view illustrating the detail of the pulley and line arrangement.
Figure 7:
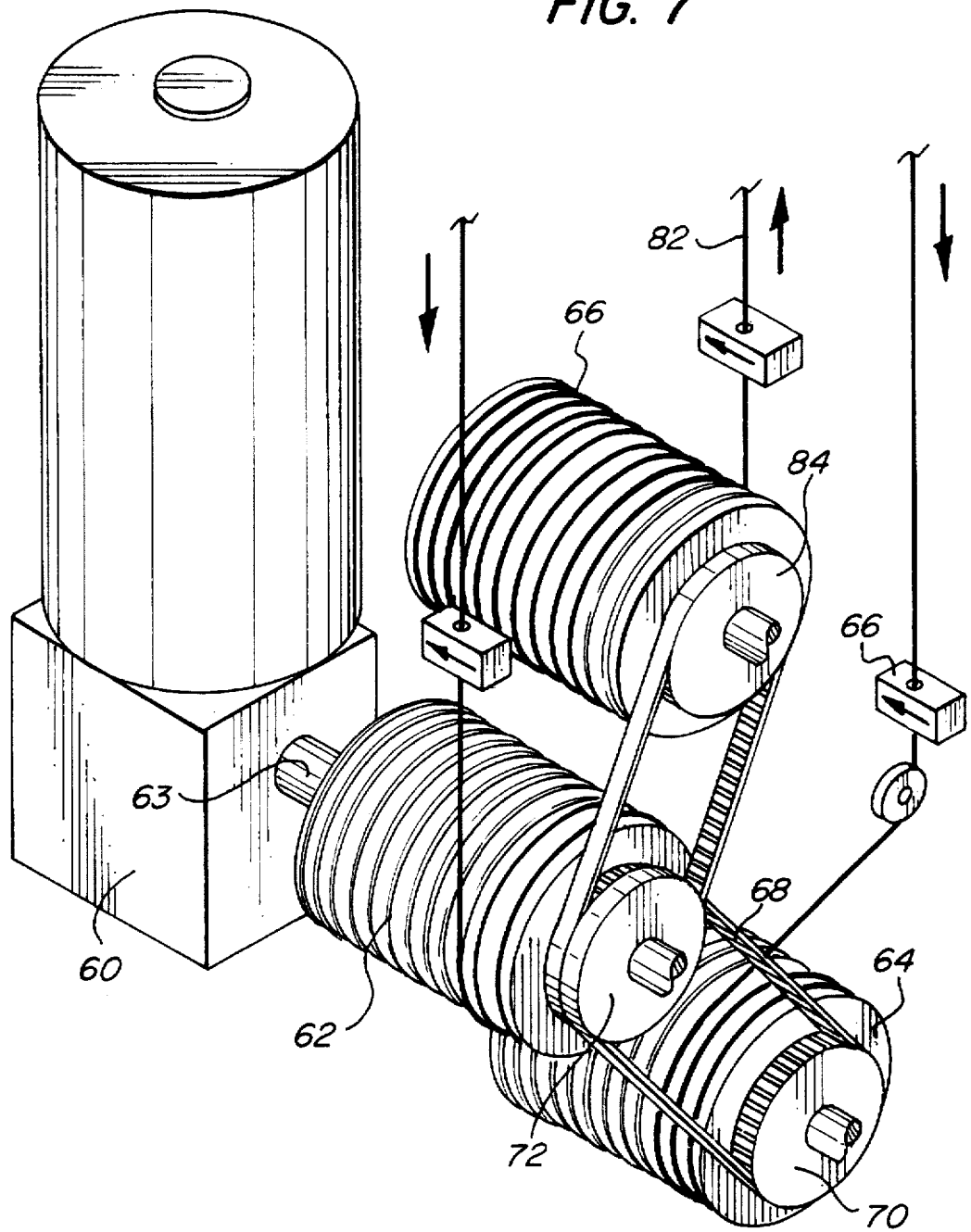
FIG. 7 is a schematic view illustrating a preferred drive mechanism.

FIG. 5 shows the preferred use of shock absorbers 36 and stops 38 for them. Each of the intermediate tubular segments and the terminal tubular segment can carry a pair of the shock absorbers on opposite external walls at the lowermost end. The stops are positioned cooperatively on opposite sides of the uppermost ends of telescoping segments. The shock absorbers can be spring loaded or of other suitable construction.

The drive mechanism for raising and lowering the mast is located partially inside and partially outside of the base tubular segment 20. The drive mechanism includes a power unit 60, at least one drive drum and a drive line 50. If desired, a power source, such as a battery pack or transformer can be included. While not shown, it is preferred to include a means to manually raise and lower the mast, such as by a crank attached to the power unit.

The power unit 60 includes an electric motor and suitable gearing and is shown to be located outside of the base tubular segment 20. The electric motor is preferably capable of AD/DC operation. The power unit drives at least one, but preferably three drums (62, 64, and 66) which are located inside the base tubular element. Drums 62 and 64 are power-up drums and are engaged with the power unit to enable the drum to be rotated by it. As noted above, it is preferred to have two mirrored power-up drive systems for positive, smooth operation. Each power-up drum has a line 50 affixed at one end to the power-up drum and the other to the terminal tubular segment, e.g. at point 44 or opposite to it. Guides 66 of conventional construction can be provided to assure uniform arrangement of the line 50 on the drums.

Figure 4:
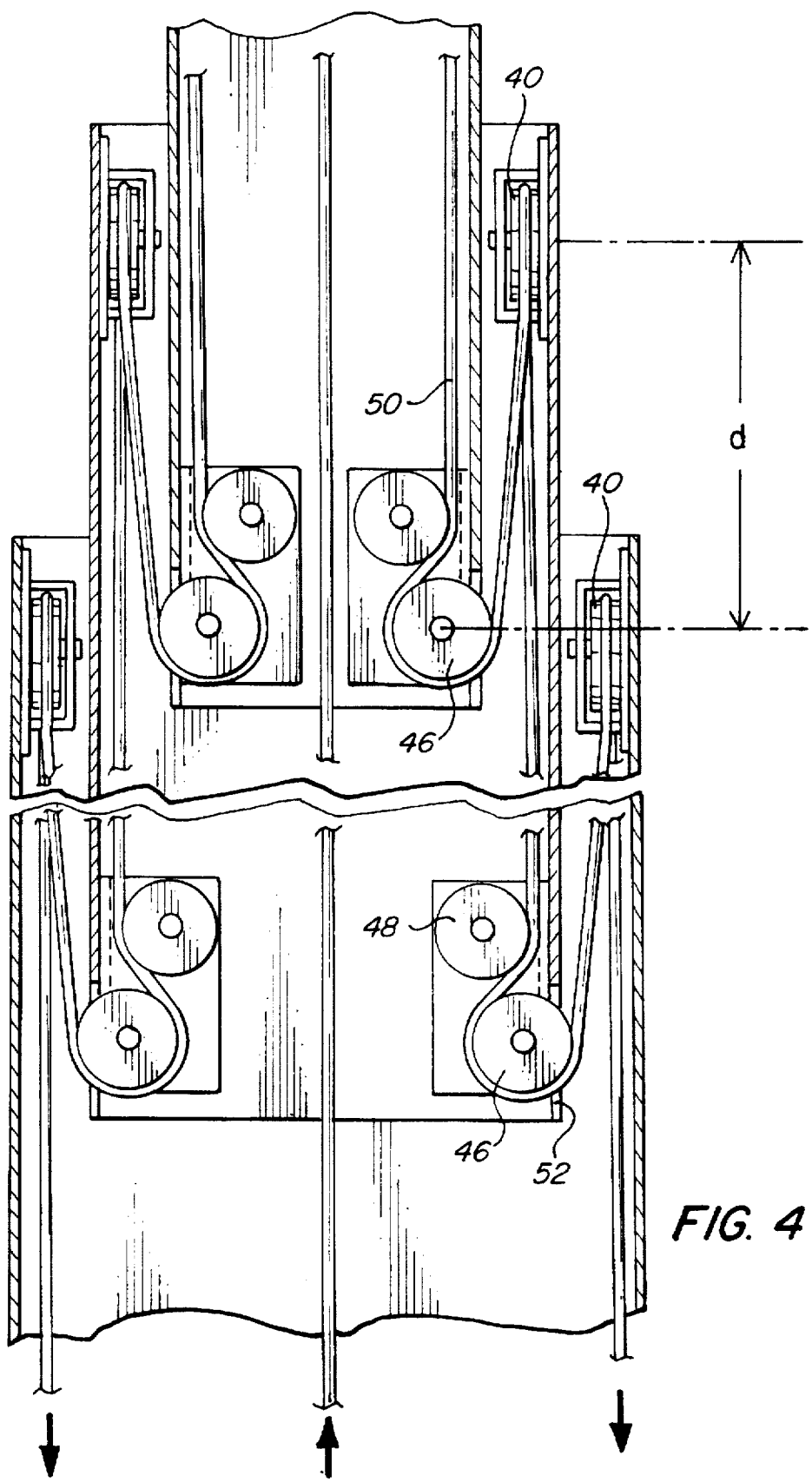
FIG. 4 is a cross sectional view taken along line 4—4 in FIG. 1.

As can be seen in FIGS. 2 and 4, the line 50 is threaded from the drum 62 though pulley 40 at the uppermost end of the base tubular segment 20, to pulley 46 at the lowermost end of an intermediate tubular segment, to a pulley 40 at the uppermost end of the intermediate tubular segment, and ultimately over pulley 46 at the lowermost end of the terminal tubular segment to a point of attachment at the uppermost end of the terminal tubular segment. The point of attachment can include a spring or other resilient means to cushion stops and starts.

In addition to the two power-up drums 62 and 64, the preferred form of the invention will also include a power-down drum 66 to provide a positive retraction force. Drum 66 has a line 82 attached to it. The line then preferably extends directly to the terminal tubular segment where it is affixed. Rotation of the drum 66 to retract the line 82 smoothly brings the mast from any degree of extension to a less extended position.

In operation, the power unit will drive drum 62, such as by direct connection from a rotating drive shaft 63. The second power-up drum 64 is driven at exactly the same rate such as by a suitable drive belt, preferably with teeth as shown for positive drive by complementary teeth in drive wheels 70 and 72. The power-down drum 66 will be similarly connected, and will be sized in conjunction also with the drive wheel 84 to move the line 82 at the same rate but in opposite direction as the movement of line 50.

Rotation of the drum 62 counter clockwise in the drawing, will cause line to be taken up on it and drum 64 to provide a positive elevating drive. It can be seen from FIG. 4 that a shortening of the line 50 will cause the lowermost pulley 46 on an internal tubular segment to be drawn toward the uppermost pulley 40 on an adjacent telescoped tubular segment. It will be understood by those skilled in the art that the pulleys necessary for the power-up movement will cause the distance d (FIG. 4) for mast extension to be one half the length of line wound onto or unwound from the power-up drums. The power-down line to distance ratio is, however, one to one. Thus, the sizing of the drum 66 and/or the drive heel 84 must adjust for this.

A control unit is shown generally as 16 and is used to control the operation of the power unit, and the pan and tilt unit and camera if desired. The electronics are straight forward and need not be described to the skilled worker. Preferably a rocker-type foot controller is provided to enable the mast to be elevated and lowered by simply forward and rearward rocking of the foot. A joystick 86 is typically employed to operate the pan and tilt unit. A video monitor 88 can be provided to aid in camera control.

The above description is for the purpose of teaching the person of ordinary skill in the art how to practice the invention, and it is not intended to detail all of those obvious modifications and variations of it which will become apparent to the skilled worker upon reading the description. It is intended, however, that all such obvious modifications and variations be included within the scope of the invention which is defined by the following claims. The claims are meant to cover the claimed elements and steps in any arrangement or sequence which is effective to meet the objectives there intended, unless the context specifically indicates the contrary.

We claim:

1. A portable, self-contained telescoping camera tower system for high angle imaging, comprising:
   (a) a multi-segment, vertical mast including
      (i) a base tubular segment having an interior surface on which bearing means are supported, an uppermost end, a lowermost end, and a pulley mounted at the uppermost end having an axis of rotation perpendicular to a first wall of the interior surface of the base tubular segment,
      (ii) at least one intermediate tubular segment having a smaller cross sectional dimension than the base tubular segment, an interior surface on which bearing means are supported, an uppermost end, a lowermost end, and an exterior surface in contact with the bearing means on the base tubular segment; the intermediate tubular segment having pulleys mounted at both the uppermost end and the lowermost end, the pulley mounted at the uppermost end having an axis of rotation perpendicular to a first wall of the interior surface of the intermediate tubular segment, and the pulley mounted at the lowermost end having an axis of rotation parallel to the first wall and having a line carrying groove extending at least partially through the first wall;
      (iii) a terminal tubular segment of smaller cross sectional dimension than an adjacent intermediate tubular segment and having an uppermost end, a lowermost end, a first wall of an interior surface of the terminal tubular segment and an exterior surface in contact with bearing means on the adjacent intermediate tubular segment;
      (iv) wherein the base tubular segment, the intermediate tubular segment and the terminal tubular segment form nested elements;
   (b) a drive mechanism including
      (i) a power unit located outside of the base tubular segment for driving at least one drum inside the base tubular segment,
      (ii) at least one power-up drum engaged with the power unit to enable the drum to be rotated by it,
      (iii) at least one line affixed at one end to the power-up drum and the other to the terminal tubular segment, the line being threaded though the pulley at the uppermost end of the base tubular segment, to the pulley at the lowermost end of an intermediate tubular segment, and to the pulley at the uppermost end of the intermediate tubular segment; and
   (c) a control unit to control the operation of the power unit.

2. A portable, self-contained telescoping camera tower system for high angle imaging according to claim 1, wherein the tower system contains from 2 to 5 intermediate tubular segments telescoped together between the base tubular segment and the terminal tubular segment.

3. A portable, self-contained telescoping camera tower system for high angle imaging according to claim 1, wherein the tower extends to a height of from 20 to 60 feet.

4. A portable, self-contained telescoping camera tower system for high angle imaging according to claim 1, wherein pulleys are located at the lowermost ends of each intermediate and terminal tubular segment and each such pulley is paired with a parallel pulley mounted above it.

5. A portable, self-contained telescoping camera tower system for high angle imaging according to claim 1, which further includes shock absorber elements on each of the lowermost ends of the intermediate and the terminal tubular segments, and stops attached to the uppermost ends of the nested elements to cushion movement to a fully extended position.

6. A portable, self-contained telescoping camera tower system for high angle imaging according to claim 1, which further includes a power-down drum engaged with the power unit and a line attached to the power-down drum and the uppermost end of the terminal tubular segment whereby the powerdown drum can be rotated to withdraw the line and move the tower from an extended position to a less-extended position.

7. A portable, self-contained telescoping camera tower system for high angle imaging according to claim 1, which further includes a second power-up drum and associated pulleys and line that mirror the first power-up drum with its associated pulleys and line, wherein the pulleys associated with the second power-up drum are a side opposite the first wall of the nested elements.

8. A portable, self-contained telescoping camera tower system for high angle imaging according to claim 1, wherein the bearing means comprise L-shaped blocks positioned in the corners between adjacent sides of the tubular segments.

9. A portable, self-contained telescoping camera tower system for high angle imaging according to claim 8, wherein the L-shaped blocks extend substantially the full length of mating contact between any two segments.

10. A portable, self-contained telescoping camera tower system for high angle imaging according to claim 1, which further includes: a power-down drum engaged with the power unit and a line attached to the power-down drum and the uppermost end of the terminal tubular segment whereby the power-down drum can be rotated to withdraw the line and move the tower from an extended position to a less-extended position; and a second power-up drum and associated pulleys and line that mirror the first power-up drum with its associated pulleys and line, wherein the pulleys associated with the second power-up drum are a side opposite the first wall of the nested elements.

* * * * *